Oct. 10, 1950     G. W. RANSDELL     2,525,181
TWO-SURFACE DENTAL MIRROR
Filed Jan. 18, 1949
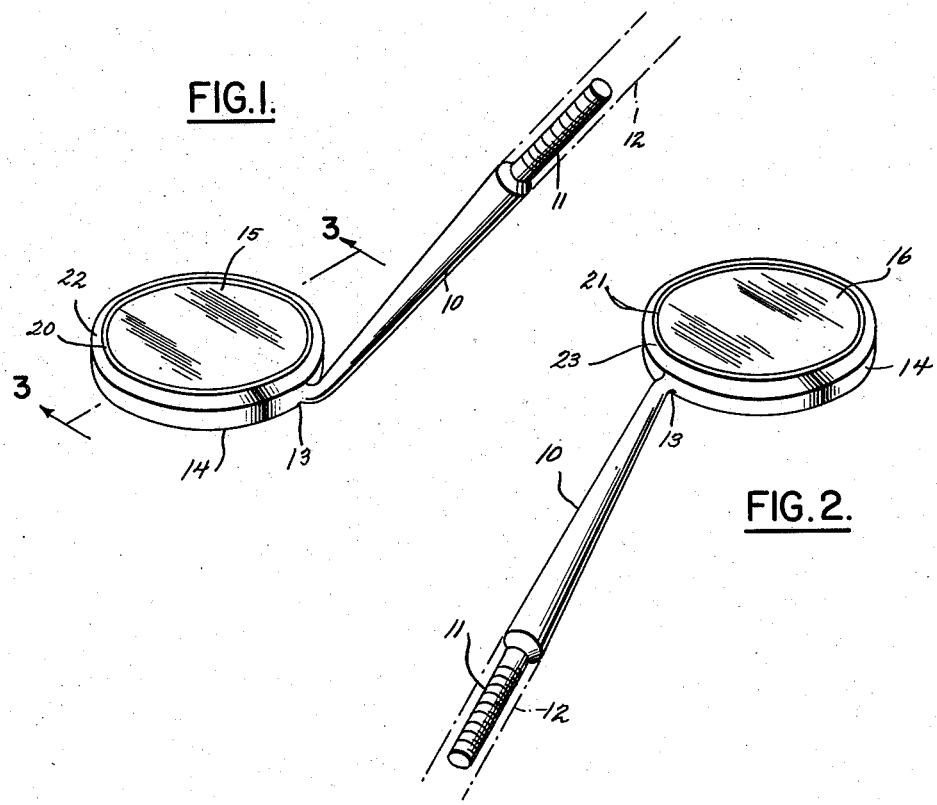
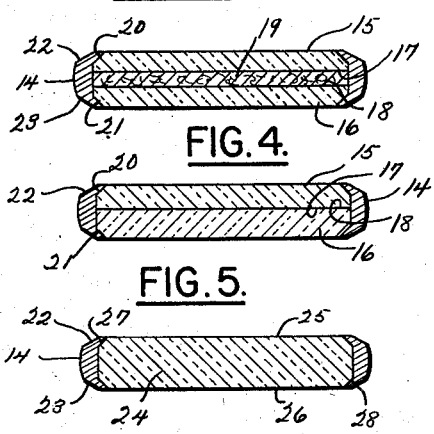
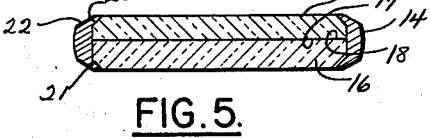
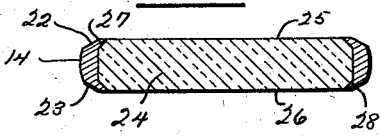
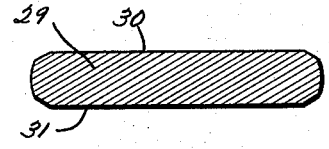
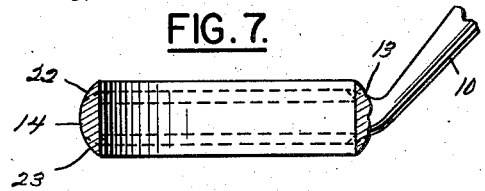
*INVENTOR.*
GEORGE W. RANSDELL
BY
Wilkinson & Mawhinney
ATTORNEYS Patented Oct. 10, 1950

2,525,181

UNITED STATES PATENT OFFICE 2,525,181

TWO-SURFACE DENTAL MIRROR

George W. Ransdell, Elizabethtown, Ky.

Application January 18, 1949, Serial No. 71,447

2 Claims. (Cl. 88—104)

The present invention relates to improvements in a two-surface dental mirror and has for an object to provide an instrument of this type which reflects equally well from either side.

Another object of the present invention is to provide an improved mirror capable of reflecting from both surfaces but which is as thin as the conventional one-surface mirror.

A further object of the present invention is to provide a mirror of this kind in which a water-tight seal is effected between the mirror and its retaining frame so that the instrument can be sterilized by boiling or by cold sterilization.

The present invention aims to provide an improved mirror with which the dentist can examine both the upper and lower teeth without removing the instrument from the patient's mouth and without the necessity of inverting the instrument.

The present invention contemplates a two-surface mirror which in addition to the benefits flowing therefrom will retain all of the advantages of a one-surface mirror, such as, strength, durability, lightness and facility in handling.

With the foregoing and other objects in view, the invention will be hereinafter more fully described and more particularly pointed out in the appended claims.

In the drawings, in which the same parts are denoted by the same reference numerals throughout the several views:

Figure 1 is a top perspective view of the improved dental mirror constructed in accordance with the present invention, Figure 2 is a bottom perspective view of the improved dental mirror, Figure 3 is a sectional view taken on the line 3—3 of Figure 1, Figure 4 is a similar sectional view of a modified form of the invention, Figure 5 is a similar sectional view of another modified form of the invention, Figure 6 is a similar sectional view of a further modification, and Figure 7 is a fragmentary sectional view showing the frame in full lines before being formed to the mirror and in dotted lines after being formed to the mirror.

Referring more particularly to the drawings, 10 indicates a stem of any suitable length and having a reduced screw threaded portion 11 at one end thereof by which the stem 10 can be attached to any appropriate handle 12 or other device for holding it. The end of the stem 10 opposite to its screw threaded end 11 is connected as at 13 to the outer surface of a frame 14. The stem may be made integral with the frame 14 or may be attached thereto by solder or the like. The frame 14 can be in the form of a continuous one piece ring and receives therein a pair of mirrors 15 and 16 comprising a reflector which can be made of glass or other appropriate transparent material and the inner faces of which are provided with coatings or backings 17 and 18, respectively, of a reflecting substance, such as quicksilver or the like. A gasket 19 of paper or other suitable material is disposed between the mirrors 15 and 16 and engages the inner faces thereof.

The peripheral edge portions of the outer faces of the mirrors 15 and 16 are beveled as at 20 and 21, respectively. The upper edge portion 22 and the lower edge portion 23 of the frame 14 are forced inwardly into engagement with the beveled portion 20 of the mirror 15 and the beveled portion 21 of the mirror 16, respectively. This inward movement of the portions 22 and 23 can be accomplished by burnishing, swaging or casting these edge portions over the respective beveled portions of the mirrors. Such an arrangement produces a strong assembly which will stand the usual rough treatment received by a conventional mirror and this construction also produces a water-tight seal which makes it possible to sterilize the instrument either by the cold method or by boiling.

In Figure 4 of the drawing the gasket 19 has been omitted so that the mirrors 15 and 16 are disposed within the frame 14 in back to back relation with the coated surfaces 17 and 18 abutting one another.

In Figure 5 of the drawing in lieu of the two mirrors 15 and 16, a mirror 24 which is made of one piece of glass or other transparent material is disposed within the frame 14. Coatings of reflecting material 25 and 26 are applied to the outer surfaces of the mirror 24. The peripheral edge portions of the outer faces of the mirror 24 are beveled as at 27 and 28. These beveled portions 27 and 28 are engaged by the swaged in portions 22 and 23, respectively, of the frame 14.

In the form of the improved device illustrated in Figure 6, the mirror 29 is made of one piece of metal or any other suitable material and reflecting qualities are imparted to the outer surfaces 30 and 31 of the mirror 29 by highly polishing them, by plating them or by otherwise affixing a reflecting coating thereupon. In this form of the device the stem 10 is connected directly to the mirror 29.

Figure 7 shows in full lines the portions 22 and 23 of the frame 14 before they are swaged into engagement with the beveled portions of the mirror and shows in dotted lines the positions of these portions 22 and 23 after they have been swaged into engagement with the corresponding beveled portions of the mirror. It will be noted from Figure 7 that the mirrors 15 and 16 or the mirror 24 can be inserted in the frame 14 from either the top or bottom thereof. The portions 22 and 23 can then be bent or pressed into engagement with the respective beveled portions of the mirrors 15 and 16 or 24 to retain them securely within the frame 14 and to provide a water-tight seal between the frame and the mirrors so that when boiling or otherwise sterilizing the instrument no fluid or other foreign material can enter the joint between the frame 14 or the mirrors. The gasket 19 shown in Figure 3 is disposed between the mirrors 15 and 16 to absorb shocks and strains when the portions 22 and 23 of the frame 14 are swaged over the beveled portions of the mirrors.

All of the parts except the reflecting surfaces of the mirrors are given a satin finish which has the effect of eliminating the reflection of light from any part of the instrument except from the reflecting surfaces of the mirrors.

In the use of this instrument it can be employed advantageously in dental examinations of or operations on the upper and lower bicuspids and molars as the dentist can perform both these functions without removing the instrument from the patient's mouth and without the necessity of inverting the instrument. The cheek of the patient may be retracted by means of the frame 14 and the image of the buccal surfaces, that is, the surfaces next to the cheek may be clearly seen in the lower reflecting surface of the mirror or if the operator is using direct vision the lower reflecting surface of the instrument may be used to reflect light on the buccal surfaces. This improved instrument is also very useful in the examination of or operation upon the lingual surfaces of the lower teeth, that is, the surfaces next to the tongue. The tongue of the patient may be depressed or held away from the field of examination or operation with the frame 14 of the instrument and the image of the lingual surfaces may be clearly seen upon the lower reflecting face of the mirror or as explained above, if the operator is using direct vision, the reflecting face of the mirror may be used to direct light to these lingual surfaces. This reflected light is extremely useful in areas where a direct light from an external source will not reach.

This improved instrument is also useful in examinations conducted by medical doctors, machinists and persons who work, examine and operate in constricted areas and where as much vision and light obtainable is needed.

While the mirrors shown in the drawings are circular in shape, it is contemplated by the present invention that these mirrors may be made in any desired shape and that these mirrors and their reflecting surfaces may be made plano-concave, plano-convex or with any other desired curvatures or series of curvatures.

It is obvious that various changes and modifications may be made in the details of construction and design of the above specifically described embodiment of this invention without departing from the spirit thereof, such changes and modifications being restricted only by the scope of the following claims.

What I claim is:

1. A two-surface dental mirror comprising a stem, a frame connected to said stem and consisting of a continuously annular one-piece ring of metal, a pair of glass lenses having mirror backings fitted in said ring with their mirror backings inwardly and adjacent one another, a compressible separator gasket between said backings and separating said glass lenses, said lenses having beveled outer peripheral edges, said ring as to both opposite edges extending radially inwardly lapping over the beveled edges of said glass lenses and retaining said lenses compressed against said gasket within said ring.

2. A two-surface dental mirror comprising a stem, a frame carried by said stem and consisting of a continuous one-piece annular metallic ring, a pair of glass lenses having beveled outer peripheral edges and mirror backings at the sides opposite the beveled edges, a compressible gasket between said pair of glass lenses, said glass lenses being relatively inverted with the mirror backings engaging opposite sides of said compressible gasket, said two lenses and gasket combined being of substantially the same depth as said ring, said ring as to both opposite edges being tapered and extending radially inwardly lapping over the beveled edges of said glass lenses and retaining said lenses compressed against said gasket within said ring.

GEORGE W. RANSDELL.

REFERENCES CITED

The following references are of record in the file of this patent:

UNITED STATES PATENTS

| Number | Name | Date |
|---|---|---|
| 610,518 | Bausch | Sept. 13, 1898 |
| 751,950 | Sharp | Feb. 9, 1904 |
| 1,278,521 | Tillyer | Sept. 10, 1918 |
| 1,722,748 | Holden | July 30, 1929 |
| 2,120,091 | Densten | June 7, 1938 |
| 2,140,005 | Greenberg | Dec. 13, 1938 |